Feb. 15, 1938.  C. H. RANDOLPH  2,108,208
MUSIC CHART
Filed Sept. 2, 1936
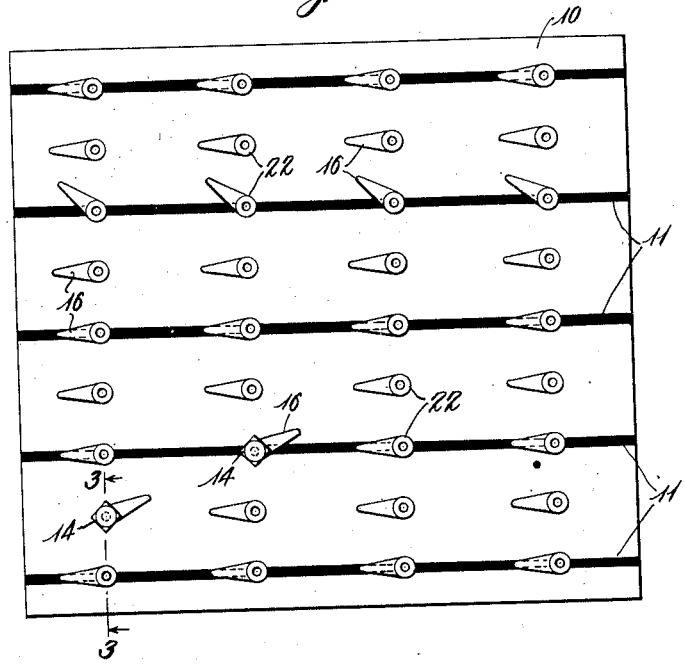
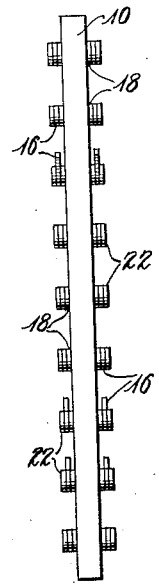
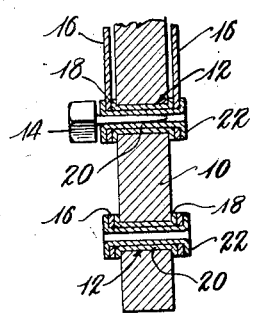
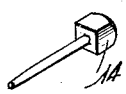
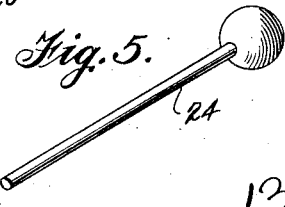
Inventor
Cary H. Randolph
By Bacon & Thomas
Attorneys Patented Feb. 15, 1938

2,108,208

UNITED STATES PATENT OFFICE 2,108,208

MUSIC CHART

Cary H. Randolph, St. Louis, Mo.

Application September 2, 1936, Serial No. 99,134

4 Claims. (Cl. 84—471)

This invention relates to improvements in charts for teaching music and refers more particularly to the character of devices wherein representations of note symbols may be positioned, at selective points along a body provided with a music staff.

The invention is primarily adapted for elementary teaching of music and the object with which it is chiefly concerned is to simplify and facilitate instruction by providing means for indicating the respective position on the staff of succeeding notes whereby music charts of the character described may be more advantageously and beneficially used by the elementary student.

For a further and more complete understanding of the improvement comprehended by the present invention, reference is had to the accompanying drawing wherein a preferred embodiment thereof has been selected for exemplification.

In the drawing:—

Figure 1 represents a plan view of a music chart embodying the principle of the present invention.

Figure 2 is an edge view of the device of Figure 1.

Figure 3 is an enlarged fragmentary section taken on line 3—3 of Figure 1.

Figure 4 is a perspective view of a headed stem for note representation adapted for use with the device of Figure 1.

Figure 5 is a perspective view of a pin which may be employed with the device illustrated.

Referring more particularly to the drawing, 10 represents any body of material having the face thereof lined or striped as at 11 to represent a music staff. In the embodiment of the invention illustrated, the body 10 is provided with a plurality of sockets 12 disposed at spaced points along the lines and intermediate the lines, which sockets are adapted to selectively receive headed stems 14 such as are shown in Figure 4 for representation of note symbols.

Adjacent the sockets 12 are pivoted pointer arms 16 which may be swung in any desired direction toward an adjacent socket to serve as a guide for positioning the note symbol indicator.

When the student constructs a measure of music using the device above described, a headed stem note symbol will be inserted in one of the sockets at the left-hand side of the body 10 and the pointer arm 16 will be turned in the direction of the socket intended to receive the succeeding symbol, which operation may be repeated until the measure or line of music is completed. The student thus readily becomes familiar with the respective positions on the staff of the various notes.

In Figure 5 is shown a pin 24 which may be of rubber or other suitable material, which pin may be employed by the student for turning the arms 16 in their proper direction or returning them to a neutral position.

The details of preferred construction are best illustrated in the enlarged fragments of Figure 3 wherein the socket 12 is fitted with an eyelet 18 in which is journalled a hollow pinion 20 having enlarged flanged end portions 22 protruding beyond eyelet 18 and serving to key arms 16. In this construction the hollow pinion is adapted to receive the stem of the note symbol. The protruding ends 22 of pinion 20 further serve as socket guides to facilitate insertion of the stem in the socket and also provide means whereby blind students may readily locate the socket by touch.

While the body portion 10 herein illustrated is provided with a flat face, the novel direction indicators of this invention are adapted for use with any desired face and may very conveniently be used with the base of my co-pending application, Serial No. 60,669, filed January 24, 1936, now Patent 2,063,269.

It is understood that the present invention contemplates broadly the provision of movable arms of any suitable shape or material or equivalent means in combination with a music chart to indicate the relative position of the various notes and is not limited to the specific construction as herein illustrated and described for exemplary purposes only.

I claim:

1. In a device for teaching music including a body lined to represent a music staff and having sockets at various points along the staff for reception of note symbols, means for indicating the position on the staff of successive notes, said means including pointer arms pivotally attached to the body adjacent the sockets.

2. A device for teaching music comprising a body having a face thereof lined to represent a music staff, sockets disposed along said staff, the surface adjacent the mouth of said sockets being elevated with respect to the adjoining surface thereby to provide touch responsive means for locating the sockets, headed stems selectively engageable in said sockets for representations of note symbols and arms pivoted at the sockets for indicating the position of succeeding notes.

3. A device for teaching music comprising a body having a face thereof lined to represent a music staff, sockets disposed along said staff, the surface adjacent the mouth of said sockets being elevated with respect to the adjoining surface, thereby to provide touch responsive means for locating the sockets, headed stems selectively engageable in said sockets for representations of note symbols and arms pivoted to the body for indicating the position of succeeding notes, each arm having an aperture registering with its respective socket.

4. In a device for teaching music including a body lined to represent a music staff and adapted to receive note symbols at various points along the staff, means for indicating the position on the staff of successive notes, said means including pointer arms pivotally attached to the body adjacent the note symbol receiving points.

CARY H. RANDOLPH.